United States Patent

[11] 3,537,373

| [72] | Inventor | Edwin H. Land |
| | | Cambridge, Massachusetts |
| [21] | Appl. No. | 629,295 |
| [22] | Filed | April 7, 1967 |
| [45] | Patented | Nov. 3, 1970 |
| [73] | Assignee | Polaroid Corporation |
| | | Cambridge, Massachusetts |
| | | a corporation of Delaware |

[54] COMPACT PHOTOGRAPHIC CAMERA INCLUDING A SCANNING EXPOSURE SYSTEM WITH COMPENSATION
16 Claims, 8 Drawing Figs.

[52] U.S. Cl.................................................. 95/36,
350/187, 95/15, 95/12.5
[51] Int. Cl........................................................ G03b 19/02
[50] Field of Search...........................................95/36, 12.5,
75, 15, 48; 350/187; 88/24(CB) (Consulted)

[56] References Cited

UNITED STATES PATENTS

| 1,136,761 | 4/1915 | Becker ......................... | 95/15 |
| 1,950,166 | 3/1934 | Durholf........................ | 95/45 |
| 2,682,194 | 6/1954 | Rosenburgh ................. | 88/24 |
| 2,966,096 | 12/1960 | D'Ineerti et al............... | 95/15 |
| 3,030,861 | 4/1962 | Mortimer et al.............. | 350/187 |
| 3,057,259 | 10/1962 | Sehuma........................ | 350/187 |

*Primary Examiner*—Norton Ansher
*Assistant Examiner*—Richard M. Sheer
*Attorneys*—Brown and Mikulka, William D. Roberson and John H. Coult

ABSTRACT: A compact hand-held photographic camera with scanning exposure system having a folded optical path. Cylindrical perspective distortion associated with scanning optical systems is compensated for by varying the lens focal length in relation to the scan angle.

FIG. 1

INVENTOR.
Edwin H. Land
BY Brown and Mikulka
and
John H. Coult
ATTORNEYS

FIG. 2

INVENTOR.
Edwin H. Land
BY
Brown and Mikulka
and
John H. Coult
ATTORNEYS

FIG. 3

INVENTOR.
Edwin H. Land
BY
Brown and Mikulka
and
John H. Coult
ATTORNEYS

COMPACT PHOTOGRAPHIC CAMERA INCLUDING A SCANNING EXPOSURE SYSTEM WITH COMPENSATION

CROSS REFERENCE TO RELATED APPLICATION INVENTION

The invention described and claimed herein relates to a novel photographic camera of a type described and claimed in a U.S. Pat. No. 3,405,619 issued to Edwin H. Land, Oct. 15, 1968 and assigned in common herewith.

BACKGROUND OF THE INVENTION:

Traditionally, hand-held photographic cameras designed to accommodate photosensitive materials with relatively large format film have been relatively bulky and cumbersome when in use because of the size of the exposure chamber which is necessary to form a relatively large photographic image with a conventional static rectilinear imaging system. The utilization of bellows is common for enabling cameras to be folded when not in use. However, the necessity of erecting such folding cameras before use and the somewhat large overall dimensions of the erected camera when in use has proven to be an inconvenience. The use of short focal length, wide angle lenses has enabled the use of nonfolding cameras with rigid-walled exposure chambers; however, apart from being somewhat bulky, the relatively small scale of the image and the problems attending the use of wide angle objectives renders such cameras unsatisfactory for many photographic applications.

A camera has been devised which overcomes the objections set forth above, accommodating a relatively long focal length objective and a correspondingly large format film, and yet offering a permanently erected exposure system in an extremely compact rigid housing. Such a camera is illustrated schematically in FIG. 1 and depicted briefly below, being described in detail and claimed in the above-identified copending patent application. In order to obtain such a compact camera, in one form (illustrated in FIG. 1) the exposure light path is folded along two mutually orthogonal axes parallel to the length and depth dimensions of the camera. The camera functions by effecting a continuous angular optical scan of the object to be photographed while simultaneously imaging successively scanned object points through a fixed focal plane exposure slit upon photosensitive materials caused to move behind the slit at a velocity which is coordinated with the rate at which the object is scanned.

A scanning exposure system as described in the above-identified copending patent application suffers the inherent lens aberrations, namely, the monochromatic (Seidel) aberrations consisting of astigmatism, coma, Petzval curvature (curvature of field), distortion, and spherical aberration in addition to the chromatic aberrations. However, such a scanning system has a number of additional aberrations, the correction of one of which, cylindrical perspective distortion (defined below), is the concern of this invention.

Figure 2:
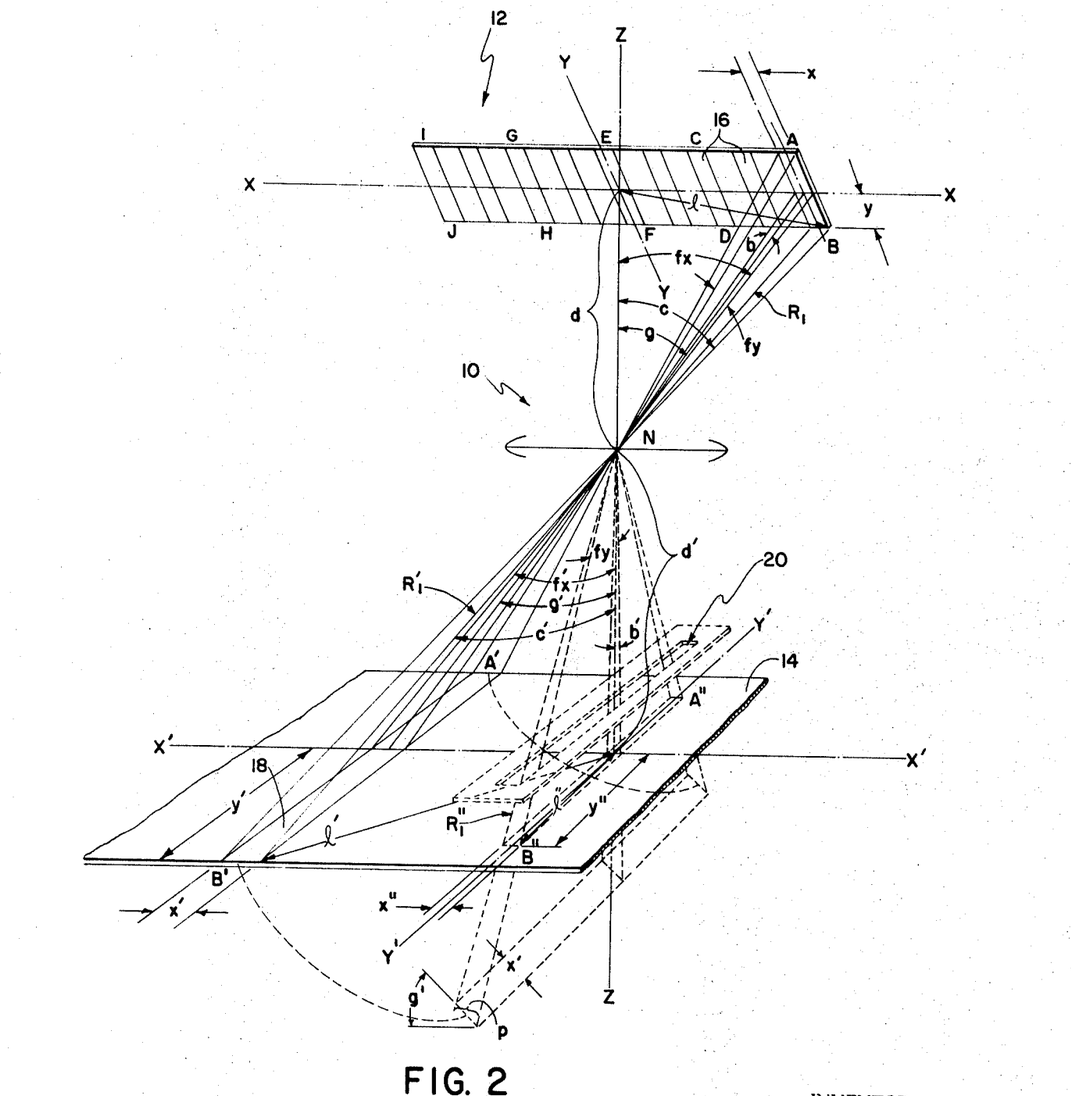
FIG. 2 is a schematic illustration of photographic image-forming systems which is useful in connection with an understanding of the background of the invention.

The nature of these additional aberrations, perhaps more aptly termed distortions, which exist in a scanning exposure system of the type described may be best understood by referring to FIG. 2 which shows schematically (in unbroken lines) a conventional static rectilinear image-forming system 10 for forming an image of an assumed focus plane, herein termed object 12, upon a planar sheet of a photosensitive material 14. The object 12 is shown as having an essentially rectangular gridlike configuration comprising a plurality of pairs of parallel lines defining equally spaced parallel strips 16 on the object 12. It is assumed that the illustrated system is orthoscopic, that is to say that the system is corrected at least for Seidel distortion such that uniform lateral magnification of the image is produced throughout the usable field. It is further assumed that the image-forming means 10 is corrected for Petzval curvature and spaced from the photosensitive material 14 such that the focal field is flat and coincident with the plane of the photosensitive material 14.

For convenience of explanation and understanding, the ends of certain of the strips 16 on the object 12 have been given literal designations; the ends of corresponding images 18 of the object strips 16 are also designated literally by corresponding primed letters.

Figure 3:
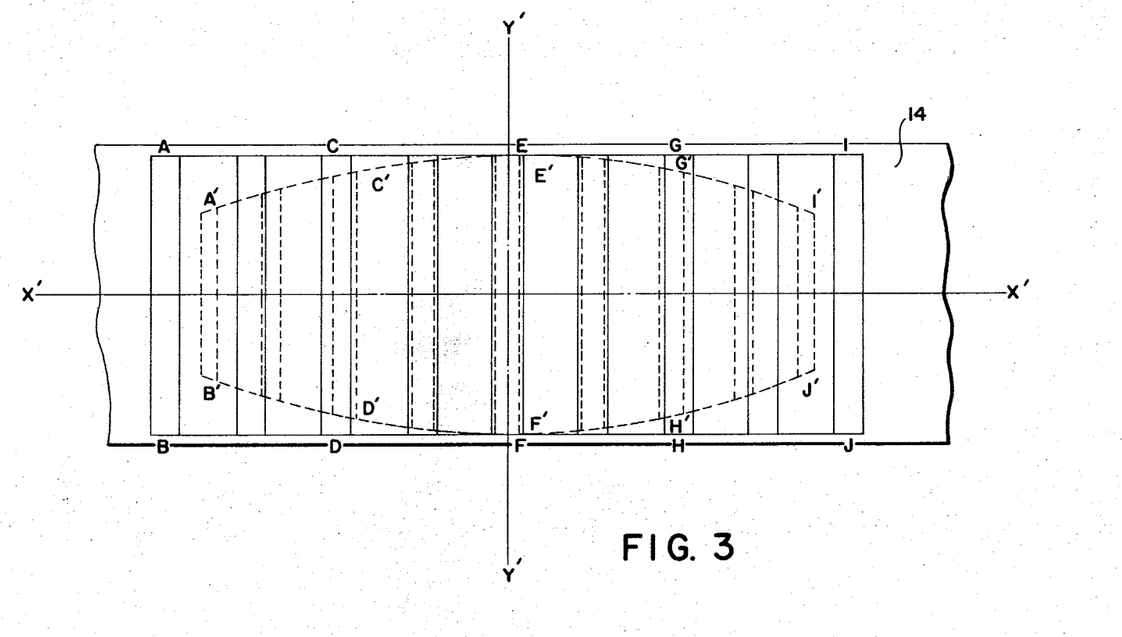
FIG. 3 is a representation of images which might be formed on image-receiving means in accordance with the image-forming systems of FIG. 1.

An image of object 12 formed by the described static rectilinear imaging system, assumed to have a flat focal field and produce a (Seidel) distortion-free image, would appear as shown in solid lines in FIG. 3 with all grid lines parallel to the X–X axis in the object 12 appearing parallel to the X′–X′ axis in the image; likewise, all object lines parallel to the Y–Y axis in the object are imaged parallel to the corresponding Y′–Y′ axis in the image. In other words, the image formed by the system exhibits uniform lateral magnification throughout the entire field.

A condition of constant magnification throughout the field demands, in accordance with Airy's tangent condition of orthoscopy, that the tangent of the slope angle which any selected chief object ray makes with the optical axis Z–Z must equal the tangent of the slope angle which the corresponding image ray makes with the same axis. In FIG. 2, the tangent of slope angle $c$ between object chief ray $R_1$ and the Z–Z axis equals the tangent of the corresponding slope angle $c'$ in image space defined by the image chief ray $R'_1$ and the axis Z–Z. Thus, as seen in FIG. 3, the (solid line) image of the gridlike assumed object 12 that would be formed by the image-forming means 10 is an accurate and undistorted facsimile of the object 12.

The camera with which the subject invention is particularly suited, described briefly above, is rendered capable of exposing a relatively large format film with a comparatively long focal length objective in an extremely compact exposure chamber by causing the light path from the scene to the photosensitive material to be folded, and by effecting a scan of the object simultaneously and in close coordination with a transport of the photosensitive material behind a fixed focal plane exposure slit. With such an exposure system the effective field angle along the scan (X–X) axis of the image-forming means 10 at any instant during exposure is a fraction of the field angle defining the total field captured during a total exposure interval.

In terms of the FIG. 2 illustration, to expose the entire object 12 to produce an image as shown in solid lines in FIG. 3 with a static rectilinear system, half-field angles along the X–X and Y–Y axes, designated $f_x$ and $f_y$, respectively, in the object space and $f'_x$ and $f'_y$, respectively, in the image space, and a correspondingly large exposure chamber would be required. Scanning panoramic cameras of the type which maintain the photosensitive materials in a fixed position during exposure also require a correspondingly large exposure chamber. The camera with which this invention is associated enables the use of an exposure chamber which is compact in comparison. This camera effects an exposure of the entire object 12 by scanning successive strips (parallel to the Y–Y axis) of the object (with means not shown in FIG. 2) and imaging the elemental scanned strips along a fixed axis through an elongated focal plane slit upon photosensitive materials 14 caused to be transported at a predetermined velocity behind the slit. The broken line portion of FIG. 2 illustrates very schematically, without showing specific means for scanning the object or means for folding the optical path from the scanned elements, that by scanning the object and folding the optical path from the scanned elements to the photosensitive material 14, the effective instantaneous half-field angle $b$ ($b'$ in the image space) along the X–X axis which is required at any instant during exposure is a fraction of the total half-field angle ($f_x$) along the same axis.

The broken line portion of FIG. 2 is useful also in illustrating the effect upon image formation of maintaining the image distance constant in a scanning exposure system for object distances varying in accordance with changing scan angles.

As indicated above, certain distortions not occurring in static rectilinear exposure systems are inherent in scanning exposure systems in which the image distance is maintained substantially constant for all object distances. The broken line ray diagram in FIG. 2 represents the light forming an image of strip AB, as it would appear if deflected at nodal point N along the Z-Z axis and through the focal plane aperture 20 into impingement with the photosensitive material 14. From a study of FIG. 2, it may be recognized that the image of strip AB, as it would appear if imaged as shown in the broken line segments of FIG. 2, would form an image A"B" which is not only unfocused, but which is distorted by a lack of scale. The image A"B" lacks the proper scale along both the X'-X' and Y'-Y' axes resulting from a loss in magnification over what would be obtained in a static rectilinear system corrected as indicated above. Thus, $y''$ is less than $y'$ and $x''$ is less than $x'$. This magnification deficiency is due to the effect of an insufficient image distance in relation to the object distance of strip AB. Consider the effect, for example, on chief ray $R_1$. Recalling that for uniform lateral magnification of the image throughout the field, the tangent of angle $c'$ must equal the tangent of angle $c$; it is seen that whereas in the rectilinear system the ratio of $l'/d'$ (the tangent of angle $c'$) is proportional to $l/d$ (the tangent of angle $c$) the ratio of $l''/d'$ is not proportional to the ratio of $l/d$ and thus the lateral magnification of the image A"B" is not as great as it must be if the image to be produced by the scanning system as described is to have constant lateral magnification throughout the field.

As explained above, the unbroken lines in FIG. 3 represent the image of object 12 that would be formed by an orthoscopic image-forming system. The broken lines represent an image of the illustrated object 12 which might result if a scanning exposure system as described were employed to photograph the object 12. The image, as described above, would be formed by scanning adjacent elemental strip areas of the object 12 from right to left (with scanning means not shown) concurrently as the photosensitive material 14 is caused to be transported behind the focal plane slit 20 at a velocity effective to maintain the image being formed on the material 14 stationary with respect to the material 14. From a study of FIG. 3, it is seen that the image thus formed exhibits a lack of scale which increases toward the extremes of the field.

Or stated in another way, a perspective relationship exists between the object 12 and its image. Assuming a planar object, as shown, object areas of equal magnitude subtend, with respect to the nodal point N of the image-forming means 10, successively smaller angles at greater off-axis scan angles. However, because of the varying image magnification, due to the changing ratio of image distance (constant for all scan angles) to object distance (varying with the scan angle) in the illustrated system, the images thus formed of off-axis points will have insufficient scale.

It is noted that the scanning exposure system depicted schematically by broken lines in FIG. 2 bears a resemblance to scanning panoramic cameras of the type which form images upon a cylindrical image-receiving surface, the axis of which cylindrical surface passes through the nodal point of the image-forming means. In each case all elemental image areas corresponding to areas on a planar object are imaged at the same image distance. And in fact, the barrel-like distortion of the images produced in each system by a lack of magnification of the images of off-axis (the Z-Z axis) object areas is the same. This distortion caused by magnification deficiency is herein termed cylindrical perspective distortion for reasons which are evident from the above discussion.

It should be understood in connection with the above discussion that the image distance in the described scanning exposure system indicated to be constant is only constant with respect to the scan (X-X) axis, and that along the Y-Y axis the conditions of a static rectilinear system obtain. A lack of magnification is introduced in the direction parallel to the Y-Y axis which is of a magnitude proportional to the cosine of the scan angle (the angle along the X-X axis defined by the Z-Z axis and the chief ray from a particular scanned element); however, the resulting distortion is simply a scale error caused by the dependence of the Y-Y axis scale coefficient upon the scan angle.

In addition to the cylindrical perspective distortion resulting from the compression of the image along the X'-X' axis and Y'-Y' axis, an additional distortion is introduced because of the angle which the image plane of the image-forming means makes with the plane of the photosensitive material 14. This angle has been designated $g'$ in the broken line portion of FIG. 2, being the same as the scan angle $g$. The projection A"B" upon the photosensitive material of the deflected image A'B' is shortened in its dimension along the X'-X' axis by a factor proportional to the secant of the instantaneous scan angle $g$. This distortion, which may be termed oblique distortion, introduced in the direction along the X'-X' axis, although present and very real is not the concern of this invention and is, in the interest of clarity and simplicity, disregarded below wherever practicable.

It is evident from Fig. 2 that:

$$\frac{x''}{p} = \frac{1}{\sec. g'} \text{ and } \frac{p}{x'} = \frac{1}{\sec. g'}$$

Therefore $\frac{x'}{x''} = \sec.^2 g' = \sec.^2 g$.

Thus, the total distortion along the X'-X' axis of an image produced by the described scanning exposure system (aside from any true Seidel distortion which may exist in the image-forming system 10) is proportional to the square of the secant of the instantaneous scan angle $g$ and is due to the combined effects of cylindrical perspective distortion and oblique distortion. The total distortion in the direction parallel to the Y'-Y' axis is proportional to the first power of the secant of the instantaneous scan angle $g$ and is due solely to the above-described effect of cylindrical perspective distortion.

PRIOR ART

The presence of the described cylindrical perspective distortion in images produced by scanning and panoramic cameras has long been recognized. In one prior art disclosure involving a scanning panoramic camera imaging upon fixed planar image-receiving means, means are provided for effecting variations in the image magnification during a scan of the object in order to compensate for cylindrical perspective distortion. However, such a camera has an exposure chamber as large as that of a corresponding static rectilinear exposure system, and thus would be extremely cumbersome and unsuited for a hand-held camera.

High speed aerial cameras have been devised which employ scanning means, such as a rotatable dove or double-dove prism, and image-forming means fed by the scanning means to record panoramic images upon film materials moved continuously behind a stationary focal plane slit. However, compensation of the resulting cylindrical perspective distortion has not yet been achieved in these cameras.

OBJECTS OF THE INVENTION

Accordingly, it is an object of this invention to provide an extremely compact photographic camera having a scanning exposure system and means for compensation for distortions in the images produced by the exposure system.

It is another object of this invention to provide a compact photographic camera having an image-forming system for optically scanning an object to be photographed and imaging successively scanned object points in succession at an image area such that a total image of the object may be recorded upon image-receiving means moved relative to the image area during a scan of the object, the system further including compensation means coordinated with the scanning means for altering the magnification of elemental images formed successively during a scan of the object such that all parts of the total image formed are substantially free from cylindrical perspective distortion, as defined above.

It is a further object that such compensation means be adaptable to a scanning exposure system having an optical path folded such that it may be accommodated in an extremely compact exposure chamber. It is yet another object that such distortion-compensated images be in sharp focus throughout all parts of the image area.

Other objects of the invention will in part be obvious and will in part appear hereinafter.

SUMMARY OF THE INVENTION

One form of this invention concerns a scanning exposure system for exposing photosensitive materials in a compact photographic camera, including image-forming means for forming an image of an object to be photographed at a predetermined image area and scanning means cooperating with the image-forming means to effect a continuous angular optical scan of the object such that successively scanned object points are imaged in succession by the image-forming means at the said image area. Further included are means for effecting relative movement between the successively formed elemental images of the scanned object and the photosensitive material at a velocity coordinated with the scan of the scanning means such that the image thus formed is stationary with respect to the photosensitive materials. Compensation means are provided so as to be coordinated with the scanning means for altering the magnification of successive elemental images formed by the image-forming means during a scan of the object such that all parts of the total image formed are substantially free of cylindrical perspective distortion, as defined herein.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENTS

Figure 1:
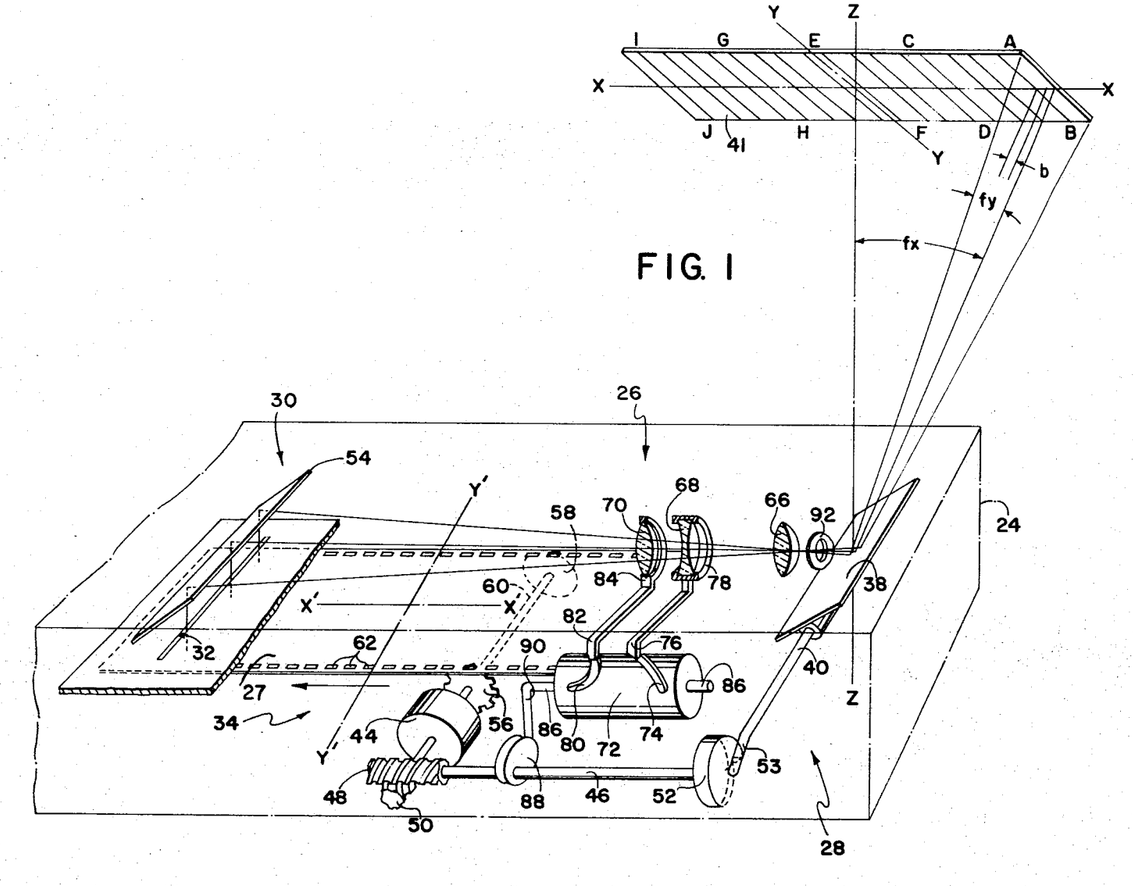
FIG. 1 is a schematic illustration of a compact photographic camera including a scanning exposure system constructed in accordance with the principles of the invention.

FIG. 1 schematically depicts a compact photographic camera having a scanning exposure system which includes means embodying the principles of the invention. As indicated above, the illustrated compact photographic camera including its scanning exposure system per se is a separate one of the invention, being described and claimed in the copending application Ser. No. 549,961, filed May 31, 1966. The invention set forth and claimed in this application is directed to means combined with such an exposure system for compensating for cylindrical perspective distortion which would otherwise be present in the images formed by such a scanning exposure system. A photographic camera incorporating a scanning exposure system as described herein may be contained within a very compact housing, the broken lines defining the outline of a housing 24 which would be sufficiently large to accommodate the necessary components of a photographic camera embodying such a scanning exposure system.

The illustrated scanning exposure system in its broadest aspect comprises image-forming means 26, scanning means 28 cooperating with the image-forming means 26 for successively scanning adjacent elemental strip areas of an object 28 to be photographed, and light reflective means 30 for folding the optical path of the exposure light from the image-forming means 26 to the photosensitive materials 27. A focal plane exposure aperture or slit 32 is located in a plane parallel to and juxtaposed with the plane of the photosensitive materials 27. Transport means 34 are provided for transporting the photosensitive materials 27 behind the slit 32 during an exposure interval.

In the illustrated embodiment the element farthest forward in the exposure system is the scanning means 28, shown as comprising a planar mirror 38 mounted upon a shaft 40 for rotation about an axis parallel to the Y-Y axis.

Means are provided for causing scanning mirror 38 to oscillate during an exposure interval to scan along the X-X axis from one extreme to the other of an object to be exposed, here shown as a planar object 41 similar to object 12 in FIG. 2. In the illustrated embodiment such means are shown as taking the form of a motor 44, which may, for example, be electrically or spring powered, which drives a shaft 46 through a set of worm gears 48, 50 upon which is mounted an axial cam 52 operatively engaging a transverse extension 53 on shaft 40. It is evident that by a proper design of the depicted scanning means, the scanning mirror 38 may be caused to periodically scan an object to be photographed through any desired field angle and return again to its initial position, and may be caused to do so at any desired periodic rate.

As indicated above, the scanning exposure system includes light reflective means 30 for folding the optical axis from the image-forming means 26 to the photosensitive materials 27. The light reflective means for this purpose may take the form of a planar mirror 54 disposed adjacent the slit 32 and angled with respect to the plane thereof for directing the exposure light in the image space through the slit 32 and into impingement with the photosensitive material 27. In the illustrated exposure system the mirror 54 comprises, in combination with the scanning mirror 38, means for folding the optical axis of the exposure light substantially along mutually orthogonal axes parallel to the X-X and Y-Y axes, respectively. As discussed above in connection with the background for this invention, with such a scanning exposure system the effective instantaneous field angle ($2b$) along the X-X axis in image space is but a fraction of the total field angle ($2f_x$) in object space (along the same axis) which may be captured during an exposure interval. Thus, the depicted scanning exposure system may have an exposure chamber whose dimension parallel to the X'-X' axis is very substantially less than the corresponding dimension in the exposure chamber of a conventional hand-held camera employing a static rectilinear system of corresponding focal length and film format size.

Transport means 34 are provided for transporting the photosensitive materials 27 behind the exposure slit 32 during an exposure interval at a velocity which is closely coordinated with the sweep rate of the scanning mirror 38. Careful correlation between the film transport velocity and the scan rate is necessary in order that successively scanned object points are imaged in the correct adjacent relationship on the photosensitive materials 27 to cause the image formed on the photosensitive materials 27 to be substantially stationary with respect thereto. Such transport means may include the motor 44 and a pair of sprockets 56, 58, mounted on shaft 60 for engaging perforations 62 in the photosensitive material 27 to provide a driving connection between the motor 44 and the photosensitive material 27.

As more fully explained in the above-identified copending application, the transportation of the photosensitive material 27 behind the exposure slit 32 effectively acts as a focal plane shutter. The time during which each point on the photosensitive material 27 is exposed during a total exposure interval accords with the relationship:

$$T = S/V$$

Where S = slit width and V = velocity at which the photosensitive material 27 is transported relative to the exposure slit 32.

It is evident that by a proper selection and correlation of the rotational speed of the motor 44, the gear ratio of the worm gears 48, 50, the relative radii of the sprockets 56, 58 and the shaft 60 upon which they are mounted, and the factors involved in the cam drive by axial cam 52 of the mirror 38, the rate at which the object 41 is scanned by the scanning mirror 38 may be very closely coordinated with the velocity at which the photosensitive material 27 is transported behind the exposure slit 32.

It is noted that a constant sweep rate of the scanning mirror, assuming a constant velocity of the photosensitive materials during exposure, would produce an image that is smeared increasingly toward the extremes of the field. This smearing of the image is a result of the increasing effective sweep rate across the surface of the photosensitive material 27 at increasing off-axis scan angles. A comprehensive understanding of the sweep velocity characteristic of the scanning mirror 38 which is necessary to produce an image without smear is not essential to the understanding of this invention and, accordingly, an in depth analysis of this problem is not thought to be appropriate here. However, it is noted that required sweep rate is a function of the square of the cosine of the instantaneous scan angle.

In accordance with the principles of this invention, means are provided for altering the scale of elemental images formed successively during an exposure interval such that all parts of the total image formed are substantially free of cylindrical perspective distortion.

In order that the magnification of successively formed elemental images may be varied as the object is scanned, in accordance with this invention the image-forming means 26 is varifocal. A simple, mechanically compensated three-element varifocal zoom lens is depicted in order that the principles of the invention may be most clearly explained. It is to be understood, however, that optically compensated, rather than mechanically compensated, zoom systems may also be employed. In practice a much more complex, highly corrected zoom lens would be preferred to the illustrated three-element lens. It is further noted that a zoom lens employed in accordance with this invention may also be afocal and used in conjunction with a fixed-focus rear element.

In FIG. 1 the zoom lens is illustrated as comprising a forward positive element 66, and axially variable negative second element 68 and an axially variable positive third element 70. The forward element 66 is illustrated as being fixed in order to illustrate that no movement thereof is necessary during exposure to accomplish the objects of the invention. However, in practice, this element 66 would be capable of axial adjustment for effecting focus adjustments to accommodate objects at different object distances.

An axial cam 72 is provided for effecting axial movement during an exposure interval of the second and third lens elements 68 and 70, respectively. Cam 72 includes a first camming slot 74 for driving a cam follower 76 connected to a lens support 78 for the negative second element 68. A second camming slot 80 drives a cam follower 82 connected to a lens support for the positive third lens element 70.

In order that the cam 72 may be driven during an exposure interval in coordination with the sweep of scanning mirror 38, cam 72 is mounted for rotation about a shaft 86 which is driven with an oscillating motion by a radial cam 88 on shaft 46 which engages a transverse arm 90 extending from shaft 86. By a proper design of the configuration of radial cam 88, cam 72, and the camming slots 74, and 80, the relative spacing between the three elements of the zoom lens may be varied in a predetermined manner in accordance with conventional principles of varifocal systems to effect changes in magnification of the elemental images formed while maintaining the focal plane of the zoom lens at a fixed plane coincident with the plane through which the photosensitive material 27 is transported.

It is noted that in the illustrated embodiment of the invention a compact exposure chamber having substantially orthogonal length (along the X'-X' axis) width (along the Y'-Y' axis), and depth dimensions is formed. One limit of the length dimension is defined herein as being coincident with the rear vertex of the positive third element 70 of the image-forming means 26. As described below, the element 70 is moved slightly during a scan of the object. Thus, the length dimension of the effective exposure chamber will also be caused to vary correspondingly.

It is recognized that because of the dependence of the f-number on the focal length, in order to maintain a constant exposure value during an exposure interval as the effective focal length of the zoom lens is varied, the effective aperture must be also varied. However, for the sake of clarity in illustrating the principles of the invention, a fixed aperture 92 is shown.

The manner in which the above-described deficiency in scale in the images of off-axis object points is compensated in accordance with this invention may be most easily understood in connection with a description of the operation of the total exposure system. It should be noted that in order to prevent a premature exposure of the photosensitive material 27, either a capping shutter may be employed, or alternatively, the leading edge of the area of the photosensitive material 27 to be exposed may be maintained sufficiently offset from the slit 32 to preclude exposure by stray light. Prior to the initiation of an exposure interval, the exposure system is preset in accordance with the settings of cams 52, 72 and 88 such that the scanning mirror 38 assumes an angular attitude for scanning the object from right to left (in FIG. 1). The camming slots 74 and 80 are aligned such that the zoom lens produces maximum magnification.

The operation of the exposure system is as follows. An exposure interval is initiated by the energization of drive motor 44, causing the photosensitive material 27 to be driven at a predetermined velocity behind the exposure slit 32. Through worm gears 48, 50 driving axial cam 52, the scanning mirror 38 is caused to sweep across the object to be photographed at a sweep velocity coordinated with the rate at which the photosensitive material 27 is transported behind the slit 32. The manner in which the magnification of the image is varied during an exposure interval may be more clearly understood by reference to FIGS. 4a-4e which represent a sequence of ray diagrams during an exposure interval. FIGS. 4a-4e depict the manner in which the magnification of strip images of successively scanned object strips is varied during an exposure interval to produce a total image all parts of which are substantially free from cylindrical perspective distortion.

In order that this invention may be more clearly understood, it is assumed herein that the respective focus planes containing each of the object points exposed in succession during a scan of the object is perpendicular to the chief object ray from that object point. See FIGS. 4a-4e. This assumption removes from this discussion two considerations which are not the concern of this application, namely, oblique distortion (described above) and the focus characteristic across the focal plane exposure slit 32 resulting from the angular separation of the focal plane and the plane of the photosensitive material behind the slit 32 as a function of the instantaneous scan angle.

Figures 4A, 4B, 4C:
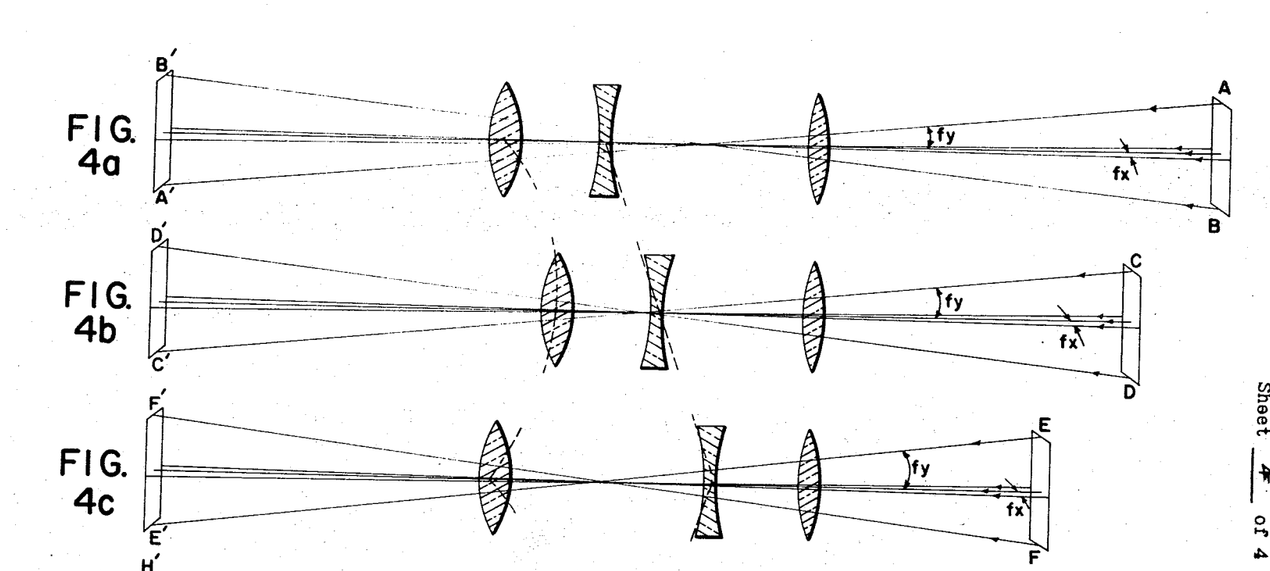
FIGS. 4a-4e are time sequence diagrams illustrating the manner in which the magnification of successively formed elemental images is altered during a scan of the object in accordance with the invention to produce images all parts of which are in focus and substantially free from cylindrical perspective distortion.
Figure 4D:
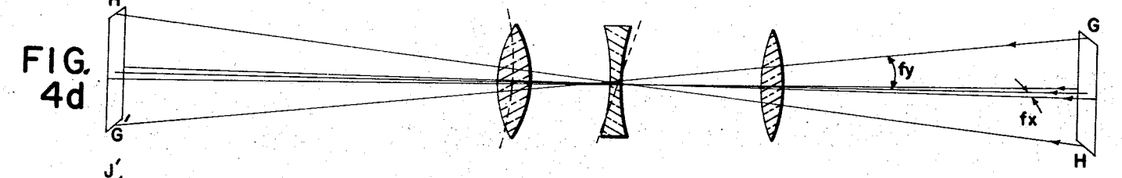
Figure 4E:
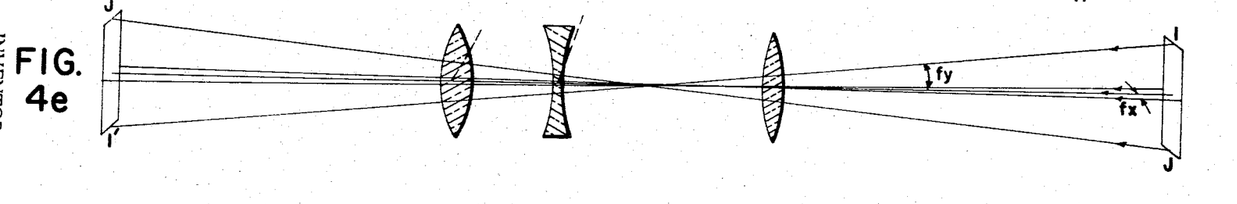

As shown in FIGS. 1 and 4, during the first half of an exposure interval as one half of the total field, designated by the half-field angle $f_r$, is scanned, the negative second element 68 of the zoom lens is moved in a generally linear manner by the action of camming surface 74 in cam 72 toward the fixed forward element 66 to effect a decrease in the magnification of successively formed strip images.

It will be seen from a study of FIGS. 4a–4e that because of the perspective relationship between object and image, the half-field angles $f_y$ along the Y–Y axis and $f_x$ along the X–X axis subtended by object strip AB at one extreme of the field are smaller than for strip CD closer to the Z–Z axis or strip EF on the axis. Correspondingly, on the opposed side of the Z–Z axis, the half-field angles $f_x$ and $f_y$ decrease to a minimum at the extreme strip IJ. Hence, to compensate for this condition, the separation of elements 66 and 68 is varied during an exposure interval such that all parts of the total image formed have the same scale. The broken line path linking FIGS. 4a–4e represent the locus of travel through which negative element 68 may be moved to effect an alteration of the magnification which will accomplish this scale uniformity throughout the image.

As is well known from the principles of zoom lens systems, the movement of the negative second element 68 toward the positive first element 66 to alter the effective focal length will have the effect of causing the focal plane to shift in a manner which may be described by a second order curve. To compensate for such a shift in the focal plane, the positive third element 70 is moved first toward then away from the object, as shown by the broken line path in FIG. 4a–4e, to maintain the focal plane substantially fixed at a position coincident with the plane through which the photosensitive material 27 is being transported. It is seen from FIGS. 4a–4e that the strip images R'Q', N'M', J'I', F'E', D'C', and B'A' have the same scale and lie in the same image plane. Thus, by this invention, a scanning exposure system having a folded optical path as described, is rendered capable of forming images all parts of which are substantially free from cylindrical perspective distortion and which are in sharp focus throughout.

Certain changes may be made in the above apparatus without departing from the scope of the invention herein involved. As examples, prisms or other scanning means might be employed for scanning the scene to be photographed. Means other than as shown might be employed for folding the optical path. Other structures may be devised by those skilled in the art for effecting relative movement between the photosensitive materials and the exposure slit in coordination with a scan of the object to be photographed and with the changes in magnification taught by this invention. Whereas the principles of the invention have been depicted in terms of a "still" camera, the invention may be readily adapted for implementation in cinematographic cameras. It is therefore intended that all matter contained in the above description or shown in the accompanying drawings shall be interpreted as illustrative and not in a limiting sense.

I claim:

1. A compact photographic camera for exposing photosensitive material comprising, in combination:
    image-forming means on an optical axis for forming a real image of at least a portion of a photographic object at an image area;
    light reflective means for folding said optical axis from said object to said image area;
    scanning means disposed on said optical axis for cooperation with said image-forming means to effect a continuous angular optical scan of the object such that successively scanned object points are imaged in succession at said image;
    means for effecting relative movement between said image area and said photosensitive material at a predetermined velocity coordinated with the scan of said scanning means such that adjacent object points scanned successively are imaged in succession upon said photosensitive material during said relative movement, whereby an image of the object may be recorded upon the photosensitive material; and
    compensation means coordinated with said scanning means and said movement-effecting means during a scan of the object for compensating for distortion produced in the image formed by said image-forming means.

2. A photographic camera including a scanning exposure system for exposing photosensitive material in the camera, comprising:
    image-forming means on an optical axis for forming a real image of at least a portion of a photographic object a predetermined image area;
    means defining an elongated focal plane aperture at said image area;
    scanning means disposed on said optical axis for cooperation with said image-forming means to effect a continuous angular optical scan of the object during an exposure interval such that successively scanned object points are imaged in succession by said image-forming means at said image area;
    transport means for transporting photosensitive material behind said aperture and through said image area at a predetermined velocity coordinated with the scan rate of said scanning means such that adjacent object points scanned successively are imaged in succession upon said photosensitive material during transportation thereof behind said aperture to maintain said image of the object stationary relative to said photosensitive materials; and
    compensation means coordinated with said scanning means and said transport means for altering image magnification during a scan of the object to substantially eliminate cylindrical perspective distortion from the images formed by said image-forming means.

3. A photographic camera including a scanning exposure system for exposing photosensitive material in the camera, comprising:
    image-forming means on an optical axis for forming a real image of at least a portion of a photographic object at a predetermined image area;
    means defining an elongated focal plane aperture at said image area;
    scanning means disposed on said optical axis for cooperation with said image-forming means to effect a continuous angular optical scan of the object during an exposure interval such that successively scanned object points are imaged in succession by said image-forming means at said image area;
    transport means for transporting photosensitive materials behind said aperture and through said image area at a predetermined velocity coordinated with the scan rate of said scanning means such that adjacent object points scanned successively are imaged successively upon said photosensitive material during transportation thereof behind said aperture to maintain said image of the object stationary relative to said photosensitive materials;
    compensation means coordinated with said scanning means and said transport means for altering image magnification during a scan of the object to substantially eliminate cylindrical perspective distortion from the images formed by said image-forming means; and
    means coordinated with said scanning means, said transport means, and said compensation means for altering the effective focal length of said image-forming means in direct correspondence with said magnification changes effected by said compensation means during a scan of the object such that the focal plane of said image-forming means is at all times during a scan maintained in the plane of said image area.

4. The apparatus defined by claim 2 wherein said image-forming means comprises a multielement varifocal lens and wherein said compensation means includes motive means for effecting relative movement between said elements of said lens to accomplish said alterations in magnification during a scan of the object.

5. A photographic camera having a compact exposure chamber with mutually orthogonal length, width and depth dimensions, and including a scanning exposure system for exposing photosensitive material in said chamber, comprising:

image-forming means on an optical axis for forming a real image of at least a portion of a photographic object at an image area in said chamber, said image-forming means having a predetermined minimum back focal length which is greater than any one of said chamber dimensions;

means defining an elongated focal plane aperture at said image area;

light-reflective means within said exposure chamber for folding said optical axis from said image-forming means to said image area such that said chamber is effective to accommodate said image-forming means having said predetermined back focal length;

scanning means disposed on said optical axis for cooperation with said image-forming means to effect a continuous angular optical scan of the object along a scan axis such that successively scanned object points are imaged in succession by said image-forming means at said image area;

transport means for transporting photosensitive materials behind said aperture and through said image area at a predetermined velocity coordinated with the scan by said scanning means such that adjacent object points scanned successively are imaged in succession upon said photosensitive material during transportation thereof behind said aperture to maintain said image of the object stationary relative to said photosensitive materials; and compensation means coordinated with said scanning means and said transport means for altering image magnification during a scan of the object such that the image of each object point is magnified in a direct relation to the magnitude of the slope angle along said scan axis in image space of the chief ray from that object point to substantially eliminate cylindrical perspective distortion from the images formed by said image-forming means.

6. The apparatus defined by claim 5 wherein said image-forming means comprises a multielement varifocal lens and wherein said compensation means includes motive means for effecting relative movement between said elements of said lens to accomplish said lens to accomplish said alterations in magnification during a scan of the object.

7. A photographic camera having a compact exposure chamber with mutually orthogonal length, width and depth dimensions, and including a scanning exposure system for exposing photosensitive material in said chamber, comprising:

image-forming means on an optical axis for forming a real image of at least a portion of a photographic object at an image area in said chamber, said image-forming means having a predetermined minimum back focal length which is greater than any one of said chamber dimensions;

light-reflective means within said exposure chamber for folding said optical axis from said image-forming means to said image area such that said chamber is effective to accommodate said image-forming means having said predetermined back focal length;

scanning means disposed on said optical axis for cooperation with said image-forming means to effect a continuous angular optical scan of the object such that successively scanned object points are imaged in succession by said image-forming means at said image area;

means for effecting relative movement between said image area and said photosensitive material at a predetermined velocity coordinated with the scan by said scanning means such that adjacent object points scanned successively are imaged in succession upon said photosensitive material during said relative movement, whereby an image of the object may be recorded upon the photosensitive material; and compensation means coordinated with said scanning means and said movement-effecting means for altering image magnification during a scan of the object to substantially eliminate cylindrical perspective distortion from the images formed by said image-forming means.

8. A photographic camera having a compact exposure chamber with mutually orthogonal length, width and depth dimensions, and including a scanning exposure system for exposing photosensitive material in said chamber, comprising:

image-forming means on an optical axis for forming a real image of at least a portion of a photographic object at an image area in said chamber, said image-forming means having a predetermined back focal length which is greater than any one of said chamber dimensions;

light-reflective means within said exposure chamber for folding said optical axis from said image-forming means to said image area such that said chamber is effective to accommodate said image-forming means having said predetermined back focal length;

scanning means disposed on said optical axis for cooperation with said image-forming means to effect a continuous angular optical scan of the object along a scan axis such that successively scanned object points are imaged in succession by said image-forming means at said image area;

means for effecting relative movement between said image area and said photosensitive material at a predetermined velocity coordinated with the scan of said scanning means such that adjacent object points scanned successively are imaged in succession upon said photosensitive material during said relative movement, whereby an image of the object may be recorded upon the photosensitive material;

compensation means coordinated with said scanning means and said movement-effecting means for altering image magnification during a scan of the object such that the image of each object point is magnified in a direct relation to the magnitude of the slope angle along said scan axis in image space of the chief ray from that object point to substantially eliminate cylindrical perspective distortion from the images formed by said image-forming means; and means coordinated with said scanning means, said movement-effecting means and said compensation means for altering the effective focal length of said image-forming means in direct correspondence with said magnification changes effected by said compensation means during a scan of the object such that the focal plane of said image-forming means is at all times during a scan maintained in the plane of said image area.

9. The apparatus defined by claim 8 wherein said image-forming means comprises a multielement varifocal lens and wherein said compensation means and said means coordinated with said scanning means includes motive means for effecting relative movement between said elements of said lens to accomplish said alterations in magnification and the maintenance of said focal plane in the plane of said image area during a scan of the object.

10. An image-forming system for optically scanning an object and successively imaging adjacent object points in the scanned object at a predetermined fixed image area such that an image of the object may be recorded upon image-receiving means transported appropriately through said image area during said scan, comprising:

image-forming means on an optical axis for forming a real image of at least a portion of an object at said predetermined fixed image area;

scanning means disposed on said optical axis for cooperation with said image-forming means to effect a continuous angular optical scan of the object such that successively scanned object points are imaged in succession by said image-forming means at said image area;

means for transporting said image-receiving means through said fixed image area synchronously with said scanning means; and compensation means coordinated with said scanning means for altering image magnification during a scan of the object to substantially eliminate cylindrical perspective distortion from the images formed by said image-forming means.

11. An image-forming system for optically scanning an object and successively imaging adjacent object points in the scanned object at a predetermined fixed image area such that an image of the object may be recorded upon image-receiving means transported appropriately through said image area during said scan, comprising:

image-forming means on an optical axis for forming a real image of at least a portion of an object at said predetermined fixed image area;

scanning means disposed on said optical axis for cooperation with said image-forming means to effect a continuous angular optical scan of the object such that successively scanned object points are imaged in succession by said image-forming means at said image area;

means for transporting said image-receiving means through said fixed image area synchronously with said scanning means;

compensation means coordinated with said scanning means for altering image magnification during a scan of the object to substantially eliminate cylindrical perspective distortion from the images formed by said image-forming means; and     means coordinated with said scanning means and said compensation means for altering the effective focal length of said image-forming means system in correspondence with said magnification changes effected by said compensation means during a scan of the object such that the focal plane of said image-forming means is at all times during a scan maintained in the plane of said image area.

12. The apparatus defined by claim 11 wherein said image-forming means comprises a multielement varifocal lens and wherein said compensation means and said means coordinated with said scanning means include motive means for effecting relative movement between said elements of said lens to accomplish said alterations in magnification and the maintenance of said focal plane in the plane of said image area during a scan of the object.

13. An image-forming system for optically scanning an object and successively imaging adjacent object points in the scanned object at a predetermined fixed image area such that an image of the object may be recorded upon image-receiving means transported appropriately through said image area during said scan, comprising:

image-forming means on an optical axis for forming a real image of at least a portion of an object at said predetermined fixed image area;

scanning means disposed on said optical axis for cooperation with said image-forming means to effect a continuous angular optical scan of the object such that successively scanned object points are imaged in succession by said image-forming means at said image area;

means for transporting said image-receiving means through said fixed image area synchronously with said scanning means;

reflective means for folding said optical axis from said image-forming means to said image area; and     compensation means coordinated with said scanning means for altering image magnification during a scan of the object to substantially eliminate cylindrical perspective distortion from the images formed by said image-forming means.

14. The apparatus defined by claim 10 wherein said image-forming means comprises a multielement varifocal lens and wherein said compensation means includes motive means for effecting relative movement between said elements of said lens to accomplish said alterations in magnification during a scan of the object.

15. A compact photographic camera for exposing photosensitive material comprising, in combination:

image-forming means on an optical axis for forming a real image of at least a portion of a photographic object at an image area;

light reflective means for folding said optical axis from said image-forming means to said image area;

scanning means disposed on said optical axis for cooperation with said image-forming means to effect a continuous angular optical scan of the object along a scan axis such that successively scanned object points are imaged in succession at said image;

means for effecting relative movement between said image area and said photosensitive material at a predetermined velocity coordinated with the scan of said scanning means such that adjacent object points scanned successively are imaged in succession upon said photosensitive material during said relative movement, whereby an image of the object may be recorded upon the photosensitive material; and     compensation means coordinated with said scanning means and said movement-effecting means for causing the magnification to vary during a scan of the object in a direct relationship to the magnitude of the scan axis component of the slope angle in object space of the chief ray from an object point being scanned to substantially eliminate cylindrical perspective distortion from the images formed by said image-forming means.

16. A photographic camera including a scanning exposure system for exposing photosensitive material in the camera, comprising;

image-forming means on an optical axis for forming a real image of at least a portion of a photographic object at a predetermined image area;

means defining an elongated focal plane aperture at said image area;

scanning means disposed on said optical axis for cooperation with said image-forming means to effect a continuous angular optical scan of the object along a scan axis during an exposure interval such that successively scanned object points are imaged in succession by said image-forming means at said image area;

transport means for transporting photosensitive material behind said aperture and through said image area at a predetermined velocity coordinated with the scan rate of said scanning means such that adjacent object points scanned successively are imaged in succession upon said photosensitive material during transportation thereof behind said aperture to maintain said image of the object stationary relative to said photosensitive materials; and     compensation means coordinated with said scanning means and said movement-effecting means for causing the magnification to vary during a scan of the object in a direct relationship to the magnitude of the scan axis component of the slope angle in object space of the chief ray from an object point being scanned to substantially eliminate cylindrical perspective distortion from the images formed by said image-forming means.

UNITED STATES PATENT OFFICE
CERTIFICATE OF CORRECTION

Patent No. 3,537,373      Dated November 3, 1970

Inventor(s)  Edwin H. Land

It is certified that error appears in the above-identified patent and that said Letters Patent are hereby corrected as shown below:

Column 11, line 40, after "accomplish" (first occurrence) delete "said lens to accomplish".

Signed and sealed this 13th day of June 1972.

(SEAL)
Attest:

EDWARD M. FLETCHER, JR.
Attesting Officer

ROBERT GOTTSCHALK
Commissioner of Patents